(12) United States Patent
Mathieson (10) Patent No.: US 10,138,919 B2
(45) Date of Patent: Nov. 27, 2018

(54) WATERPROOF NAIL AND SCREW WITH ENLARGED HEAD AND PROTECTIVE GASKET

(71) Applicant: Thomas R. Mathieson, Louisville, CO (US)

(72) Inventor: Thomas R. Mathieson, Louisville, CO (US)

( * ) Notice: Subject to any disclaimer, the term of this patent is extended or adjusted under 35 U.S.C. 154(b) by 3 days.

(21) Appl. No.: 15/486,743

(22) Filed: Apr. 13, 2017

(65) Prior Publication Data

US 2017/0218997 A1     Aug. 3, 2017

Related U.S. Application Data

(63) Continuation-in-part of application No. 14/965,559, filed on Dec. 10, 2015, now Pat. No. 9,631,383.

(51) Int. Cl.

| | |
|---|---|
| *E04D 1/34* | (2006.01) |
| *E04D 3/36* | (2006.01) |
| *F16B 15/02* | (2006.01) |
| *F16B 15/00* | (2006.01) |
| *E04G 23/02* | (2006.01) |

(Continued)

(52) U.S. Cl.
CPC ............... *F16B 15/02* (2013.01); *E04D 1/34* (2013.01); *E04D 3/3606* (2013.01); *E04G 23/0281* (2013.01); *F16B 15/0092* (2013.01); *E04D 2001/3408* (2013.01); *E04D 2001/3423* (2013.01); *E04D 2001/3426* (2013.01); *E04D 2001/3432* (2013.01); *E04D 2001/3494* (2013.01); *E04D 2015/045* (2013.01);
(Continued)

(58) Field of Classification Search
CPC ...... F16B 33/004; E04D 1/34; E04G 23/0281
USPC ........... 411/82.2, 258, 369, 371.1, 480, 542; 52/408, 409, 514, 514.5, 741.4, 746.1, 58
See application file for complete search history.

(56) References Cited

U.S. PATENT DOCUMENTS

| | | | | |
|---|---|---|---|---|
| 1,335,756 A | * | 4/1920 | Scarff | E04D 1/18 |
| | | | | 248/216.1 |
| 1,583,163 A | | 5/1926 | Munro | |

(Continued)

FOREIGN PATENT DOCUMENTS

| | | | | |
|---|---|---|---|---|
| FR | 2697556 A1 | * | 5/1994 | ........... E04D 3/3603 |
| GB | 2184187 A | * | 6/1987 | ............ F16B 43/001 |

(Continued)

*Primary Examiner* — Robert Canfield
(74) *Attorney, Agent, or Firm* — Husch Blackwell LLP (57) ABSTRACT

An integral nail/disk structure that eliminates the need of having any exposed nails associated with a shingled roof having a color matching body member integrally formed with a roofing nail. Another embodiment including a fastener such as a nail or screw having an enlarged head and an associated gasket member for fastening sheet metal to a roof structure. The gasket member has a sealant on both of its top and bottom surfaces so as to adhere both to the underside of the enlarged head portion of the nail or screw, and to the sheet metal to create a waterproof seal. Still another embodiment includes an enlarged cap member associated with a gasket member attached to its underside portion wherein the cap/gasket member can be attached over a fastener hole in a roof, or over a faulty roofing nail or screw in lieu of caulking techniques usually used to cure leaks where the faulty fastener attaches sheet metal to a roofing structure.

9 Claims, 2 Drawing Sheets

(51) Int. Cl.
*F16B 33/00* (2006.01)
*F16B 43/00* (2006.01)
*E04D 15/04* (2006.01)

(52) U.S. Cl.
CPC ........ *E04D 2015/047* (2013.01); *F16B 15/00* (2013.01); *F16B 33/004* (2013.01); *F16B 43/001* (2013.01)

(56) References Cited

U.S. PATENT DOCUMENTS

| | | | |
|---|---|---|---|
| 1,649,635 A | | 11/1927 | Willard |
| 2,576,262 A | | 11/1951 | Morehead |
| 2,666,354 A | * | 1/1954 | Dim ................ F16B 43/001 118/264 |
| 2,674,026 A | | 4/1954 | St. Palley |
| 2,724,303 A | * | 11/1955 | Holcomb ............ F16B 15/0092 174/159 |
| 3,049,836 A | * | 8/1962 | Weissman ............... E04G 23/02 156/295 |
| 3,230,817 A | * | 1/1966 | Thomas ................. F16B 15/00 411/372.5 |
| 3,300,173 A | * | 1/1967 | Kennedy, Jr. ............ A47G 1/22 248/205.3 |
| 3,300,913 A | * | 1/1967 | Patry ........................ E04B 1/68 52/309.8 |
| 3,468,092 A | | 9/1969 | Chalmers |
| 3,470,048 A | * | 9/1969 | Jones ..................... B21D 39/03 156/94 |
| 3,485,134 A | | 12/1969 | Ott |
| 3,750,523 A | * | 8/1973 | Fujita ...................... F16B 15/02 411/484 |
| 4,010,590 A | | 3/1977 | Reinke |
| 4,135,017 A | * | 1/1979 | Hoffmann, Sr. ........ B29C 73/00 156/94 |
| 4,147,576 A | * | 4/1979 | Beem ...................... B29C 73/00 156/94 |
| 4,177,999 A | * | 12/1979 | Raber .................. F16B 43/001 277/637 |
| 4,195,461 A | | 4/1980 | Thiis-Evensen |
| 4,292,876 A | * | 10/1981 | De Graan ............ F16B 43/001 411/369 |
| 4,343,215 A | | 8/1982 | Fuchs |
| 4,591,511 A | * | 5/1986 | Peebles, Jr. ............. B29C 73/10 156/94 |
| 4,602,971 A | | 7/1986 | Bergeron ................. D21C 5/02 156/289 |
| 4,637,191 A | | 1/1987 | Smith |
| 4,659,604 A | | 4/1987 | Lambuth |
| 4,666,762 A | * | 5/1987 | Yamamoto ............... B05D 5/08 428/216 |
| 4,686,808 A | | 8/1987 | Triplett |
| 4,688,361 A | * | 8/1987 | Kelly .................... E04D 5/143 52/173.1 |
| 4,732,633 A | * | 3/1988 | Pokorny ................. B29C 73/10 156/154 |
| 4,781,508 A | | 11/1988 | Schroeder et al. |
| 4,787,188 A | | 11/1988 | Murphy |
| 4,788,807 A | | 12/1988 | Whitman |
| 4,793,116 A | * | 12/1988 | Whitman ............... E04D 5/143 52/410 |
| 4,982,543 A | | 1/1991 | Boyd |
| 5,024,038 A | * | 6/1991 | DePellegrini ........... B08B 17/00 52/410 |
| 5,091,251 A | * | 2/1992 | Sakumoto .............. B32B 15/08 428/352 |
| 5,156,509 A | * | 10/1992 | Wu ........................ E04D 3/365 411/369 |
| 5,166,007 A | * | 11/1992 | Smith ..................... B29C 73/10 428/63 |
| 5,204,148 A | * | 4/1993 | Alexander ............. E04D 5/145 428/141 |
| 5,281,065 A | * | 1/1994 | Wu ........................ F16J 15/064 411/258 |
| 5,311,716 A | | 5/1994 | Houssin |
| 5,419,666 A | | 5/1995 | Best |
| 5,447,006 A | * | 9/1995 | Zenor ..................... E04D 5/142 156/308.6 |
| 5,662,444 A | * | 9/1997 | Schmidt, Jr. .......... F16B 41/002 411/353 |
| 5,669,277 A | | 9/1997 | Perrone |
| 5,800,891 A | | 9/1998 | Wasitis |
| 5,820,958 A | * | 10/1998 | Swallow ................ C09J 7/0246 428/194 |
| 5,916,103 A | | 6/1999 | Roberts |
| 6,148,578 A | | 11/2000 | Nowacek et al. |
| 6,405,508 B1 | * | 6/2002 | Janesky ............... E04G 23/0203 52/514.5 |
| 6,551,425 B2 | * | 4/2003 | Sylvester ................ B29C 44/06 156/79 |
| 6,979,162 B2 | * | 12/2005 | Kato ..................... F16B 19/008 411/371.1 |
| 7,146,771 B2 | * | 12/2006 | Swann ...................... E04D 5/12 52/408 |
| 7,430,837 B2 | * | 10/2008 | Hubbard ................... E04D 5/06 52/408 |
| 7,614,194 B2 | * | 11/2009 | Shah ......................... E04D 5/00 156/74 |
| 7,712,275 B2 | | 5/2010 | Kelly |
| 8,210,785 B1 | | 7/2012 | Gager |
| 8,353,995 B2 | * | 1/2013 | Stout ...................... B29C 73/02 156/94 |
| 8,528,265 B1 | * | 9/2013 | Preston ............... E04F 13/0862 52/302.1 |
| 8,763,337 B2 | | 7/2014 | Buckwalter et al. |
| 8,920,088 B1 | * | 12/2014 | Garvin ................ F16B 15/0092 411/442 |
| 9,206,835 B2 | | 12/2015 | Mathieson |
| 2002/0092252 A1 | * | 7/2002 | Kettler .................... B32B 27/20 52/403.1 |
| 2005/0102922 A1 | | 5/2005 | Williams |
| 2006/0059825 A1 | | 3/2006 | Wiercinski et al. |
| 2006/0099370 A1 | * | 5/2006 | Glass ....................... B32B 3/266 428/40.1 |
| 2007/0199251 A1 | | 8/2007 | Sieling et al. |
| 2007/0199276 A1 | * | 8/2007 | Duque ..................... E04D 1/34 52/741.4 |
| 2007/0261337 A1 | | 11/2007 | Whitaker et al. |
| 2008/0155923 A1 | | 7/2008 | Teng et al. |
| 2008/0209835 A1 | | 9/2008 | Margarites |
| 2009/0100775 A1 | * | 4/2009 | Trial ....................... E04D 5/10 52/408 |
| 2009/0145944 A1 | | 6/2009 | Shor |
| 2010/0143076 A1 | * | 6/2010 | Matsumoto ........... F16B 43/001 411/533 |
| 2010/0192509 A1 | | 8/2010 | Sieling et al. |
| 2011/0041446 A1 | | 2/2011 | Stephens et al. |
| 2011/0083391 A1 | * | 4/2011 | Thomas ................... E04D 1/34 52/514 |
| 2011/0083396 A1 | * | 4/2011 | Shelton ................. F16B 15/00 52/698 |
| 2011/0289879 A1 | | 12/2011 | Binkley et al. |
| 2011/0305540 A1 | * | 12/2011 | Litzinger ............... F16B 15/06 411/386 |
| 2012/0005983 A1 | * | 1/2012 | Stephan ................ F16B 43/001 52/741.4 |
| 2012/0027538 A1 | * | 2/2012 | Thau ..................... F16B 43/001 411/371.1 |
| 2012/0148369 A1 | * | 6/2012 | Michalski ............. F16B 43/001 411/371.1 |
| 2013/0025224 A1 | | 1/2013 | Vermilion et al. |
| 2016/0002914 A1 | | 1/2016 | Snyder et al. |
| 2016/0024794 A1 | | 1/2016 | Jenkins et al. |

FOREIGN PATENT DOCUMENTS

| | | | | |
|---|---|---|---|---|
| GB | | 2360076 A | * 9/2001 | ............ F16B 33/004 |
| JP | | 02-272152 A | 11/1990 | |

(56) References Cited

FOREIGN PATENT DOCUMENTS

| | | | |
|---|---|---|---|
| JP | 09151592 A | * | 6/1997 |
| JP | 2001-173623 A | | 6/2001 |
| WO | 8102437 A1 | | 9/1981 |

* cited by examiner

WATERPROOF NAIL AND SCREW WITH ENLARGED HEAD AND PROTECTIVE GASKET

CROSS-REFERENCE TO RELATED APPLICATION

This application is a continuation-in-part of application Ser. No. 14/965,559, filed Dec. 10, 2015.

BACKGROUND OF THE INVENTION

The present invention relates generally to systems and methods for repairing and sealing asphalt shingles and, more particularly, to an integral nail/disk combination structure for eliminating exposed roof nails when applying new or replacement shingles to a roof structure and to systems and methods for fastening sheet metal such as in the form of sheet metal flashings to shingled roofs or other roof structures.

The last course of nails typically associated with an asphalt shingled roof are often exposed to the elements. As such, many building codes typically require that this last row of exposed roofing nails be sealed with some type of sealant. Roofers typically attempt to seal the exposed roof nails by using caulking to cover such nails. This is typically messy and an inefficient process. Almost all asphalt shingles come with a 25 or 50-year manufacturer's warranty. Caulking applied to the uncovered nail heads that are exposed to the elements will typically degrade and only last a few years. This breakdown in the caulking or other sealant also exposes the roof/shingle system to premature leaks and other damage thereby mandating that the sealing procedure be repeated to preserve the integrity of the roof structure. In addition, once a tube of caulking is opened, unavoidable exposure of the contents prevents reuse of leftover caulking at another job site. As a result, caulking is wasted and is usually discarded if not entirely used. As a result, there is likewise a need to develop a system for eliminating exposed roof nails, which system would last the life of the new shingles, match the colors of the existing shingles, and save time and money if caulking and other sealants could be eliminated from the roofing process.

Moreover, sheet metal work accounts for an enormous amount of waterproofing systems used in the roof industry. For example, sheet metal is often placed below shingles in order to increase the waterproofing abilities of the roof. In addition to being used for many styles of finished roofs, sheet metal is also used for almost all flashing work. Typically, nails or screws are used to attach sheet metal to roof structures. When roofing nails or screws are used to attach metal to a roof system, there are occasions where the nails or screws are left exposed to the elements when the job is completed. As set forth above, building codes require that the installers, at the very least, seal those exposed nails or screws with caulking in order to prevent leaks. This leads to the problems described above that are associated with caulking the exposed nails or screws.

In an effort to overcome the aforementioned problems, some installers will use conventionally-sized nails or screws that have a small built-in neoprene (or similar material) gasket under the fastener head when they know that the nails or screws will be exposed to the elements. When those gaskets are used and the conventional nail or screw is installed, the downward pressure from the nail or screw head against the gasket material compresses or tightly squeezes the gasket material to the sheet metal, and also to the fastener head. This creates a water resistant seal. However, those neoprene or neoprene-like gaskets have numerous drawbacks.

First, these gaskets are small. As a result, they can wear out very quickly. Thus, technicians must routinely inspect every screw and install caulking around the loosened or deteriorated gaskets. This time-consuming and laborious procedure is repeated regularly throughout the roof's life.

Moreover, a gasketed conventionally-sized nail or screw is typically used for installing flashing metal that overlaps the roofing material. The gasketed nail or screw is typically driven or screwed through the sheet metal, then the roofing material, and then finally into the wooden structure that the roof is attached to, usually a plywood or "dimensional lumber." The wood under the roofing material nearly always includes weak areas that will not hold a nail or a screw. The weak spots may be weak due to wood rot, voids between lamination plies in plywood, wood knots in dimensional lumber, and most commonly gaps where adjacent wooden structure pieces do not touch. Such gaps may range from $\frac{1}{8}$" to $\frac{3}{4}$". Gasketed conventional nails or screws installed into these gaps or other weak spots will not have the exerted pressure needed between the fastener heads and sheet metal to keep the fasteners in place. Thus, the nails or screws in these situations are loosely attached only to the roofing material. Eventually, these nails or screws become loose and "back out" or release from the wooden surface or other structure to the point that the gasket no longer even touches the sheet metal. This greatly increases the chance that the roof leaks.

In addition, it should be noted that even nails or screws that are attached to good wood not having flaws can likewise eventually become loose. Expansion and contraction even in quality wood is unavoidable due to swings in temperature. Such expansion and contraction is also responsible for loosening fasteners.

In view of the foregoing, it will be apparent to those skilled in the art that a need exists for an integral nail/disk structure for eliminating exposed roof nails and to develop a nail or screw for fixing sheet metal to a roof that creates waterproof seals between the screw or nail head and the sheet metal. The present invention addresses these needs as well as other needs which will become apparent to those skilled in the art after reading the present disclosure.

SUMMARY OF THE INVENTION

An integral nail/disk structure is disclosed which eliminates the need of having any exposed nails associated with a shingled roof. In this aspect of the present invention, a color matching asphalt shingle disk or other disk material is integrally formed with a nail structure such that both the disk and nail are manufactured together. The body of the disk can take on any shape such as a round shape, a rectangular shape, or a square shape made of hail impact resistant shingle type material or other material which can include a reinforcing layer. A sealant can optionally cover the underside portion of the disk thereby allowing the disk to permanently seal to the existing shingle when the nail/disk structure is nailed into an existing shingle. The sealant helps to prevent water from entering under the disk. The nail structure itself may include a barbed structure to further improve attachment to the existing shingle.

The present nail/disk structure can be used in all places where an exposed nail head would typically exist on a shingled roof. More specifically, this nail/disk structure would be used as the last course of nails on a typical shingled roof as well as around dormers, chimneys and the like. The present nail/disk structure eliminates the need for caulking or using other sealants to cover exposed nail heads and likewise saves time, money and improves the sealing capacity associated with the last course of nails in a typical shingled roof. The present system and structure will last the life of the new roof shingles; it will match the colors associated with a typical roof; and it eliminates exposed nail heads.

The present invention is also directed to a fastener and gasket structure which can be used to fasten sheet metal to a roof structure. This structure creates a waterproof seal between the fastener and its associated gasket member, and the sheet metal.

The fastener portion of this structure or system generally may be embodied as a nail or a screw. The nail or screw embodiments may act as fasteners for attaching sheet metal to a roof as described above without compromising the waterproof nature of the roof. The nails or screws each generally include an enlarged head portion and a nail or screw body portion or shank. A gasket member is also provided that is generally cylindrical in shape. The gasket member surrounds the nail or screw body portion of the fastener and is attached to the fastener head portion. The present nails or screws have an enlarged head portion to increase contact area with both the gasket member and the sheet metal. The gasket's upper surface is adhered to the bottom side of the fastener's enlarged head portion via a sealant or other suitable attachment mechanism. The upper surface of the gasket member has substantially the same surface area as the bottom side of the enlarged fastener head so that it also has a substantial contact area with the fastener head and the underlying sheet metal. The gasket member also includes a lower surface having a sealant or other suitable adhesive material applied thereto. The sealant is preferably covered by a protective film, sheet or release type tape overlaying the sealant that can be removed prior to using the nail or screw to fasten sheet metal to the roof. That way, during shipment or storage, the gasket member does not lose its adhesive sealing qualities over time or stick to other unwanted structures or tools.

When the present nail or screw is installed, an installer first removes the protective film from the bottom side of the gasket member. When the fastener is ready to be used, it may be either nailed or screwed into the sheet metal to attach it to the roof structure. When the bottom surface of the gasket member comes into contact with the sheet metal, the aggressive adhesive or sealant associated therewith creates a strong bond between the fastener's head and the sheet metal via the gasket member. This strong bond may be created and sustained even if the nail or screw is fastened to the sheet metal above an unavoidable flaw in the underlying wooden roof structure (e.g., wood rot, knots, gaps between adjacent wood structures). As such, the sealant on the gasket creates a waterproof seal between the gasket member and the sheet metal that will not loosen or back out like the prior art small gaskets are prone to do. Because the fastener head is enlarged, it more than sufficiently covers and surrounds the hole formed in the sheet metal by the fastener and the similarly sized and shaped gasket extends outwardly away from the hole formed by the fastener a greater distance than the prior art fasteners so as to ensure a waterproof tight seal around the fastener hole formed in the sheet metal.

A cap member preferably made of metal also having a gasket member integrally associated therewith is also provided to repair failing, faulty, conventionally gasketed nails or screws having the flaws discussed above. The cap member is also enlarged so as to increase the contact area around the existing nail or screw with the adhesive gasket member and also to provide a surface area that is substantially greater than the surface area of the faulty nails or screws, so that if any water or other liquid were to somehow penetrate the gasket, it would still be far from the location of the leak. Like the adhesive gasket member used with the fasteners, the gasket member is preferably substantially cylindrical and has its upper surface adhered to the bottom surface of the cap member by a suitable adhesive, sealant or other means. The lower surface of the gasket is again coated with an aggressive sealant or adhesive, and is provided with a protective film that can be removed prior to adhering the cap member to a faulty nail or screw. The protective film or release tape again protects the gasket so that it does not lose its adhesive sealing qualities over time or stick to other unwanted structures or tools during shipment or storage.

The present cap member may be used in at least two ways. First, the cap member may be used to cover up leaky portions of the conventional fastener/sheet metal connection points caused by faulty fastener and gasket combinations like those discussed above. In that case, a technician may first remove the faulty nail or screw and gasket. Subsequently, the protective film should be removed from the present cap and gasket system to expose the sealant before affixing the lower surface of the gasket member to the sheet metal, thus creating a strong bond between the cap member and the sheet metal via the gasket. This bond is preferably waterproof and long-lasting.

The cap member may also be used to cover conventional non-gasketed roofing nails in lieu of caulking. In that scenario, the cap and gasket combination may be placed over and on top of the nail without having to first remove the nail. Then, the protective film may be removed before adhering the lower surface of the gasket member to the roofing nail to bond the cap member and gasket to the top of the roofing nail and its surrounding area. This seal is an improvement over caulking because it provides a much stronger bond to the sheet metal or other roof structure as compared to caulking which deteriorates over time, and because the cap member is enlarged and therefore provides a greater area of seal around the non-gasketed fastener.

These and other specific aspects and advantages of the present embodiments will be apparent to those skilled in the art after reviewing the following detailed description of the illustrative embodiments set forth below which, taken in conjunction with the accompanying drawings, disclose improved structures for the roofing industry.

DETAILED DESCRIPTION OF THE INVENTION

Several embodiments of the present invention will now be explained with reference to the accompanying drawings. It will be apparent to those skilled in the art from this disclosure that the following description of the various embodiments of the present invention is provided for illustration purposes only and not for the purpose of limiting the present invention as defined by the appended claims and their equivalents.

Figure 1:
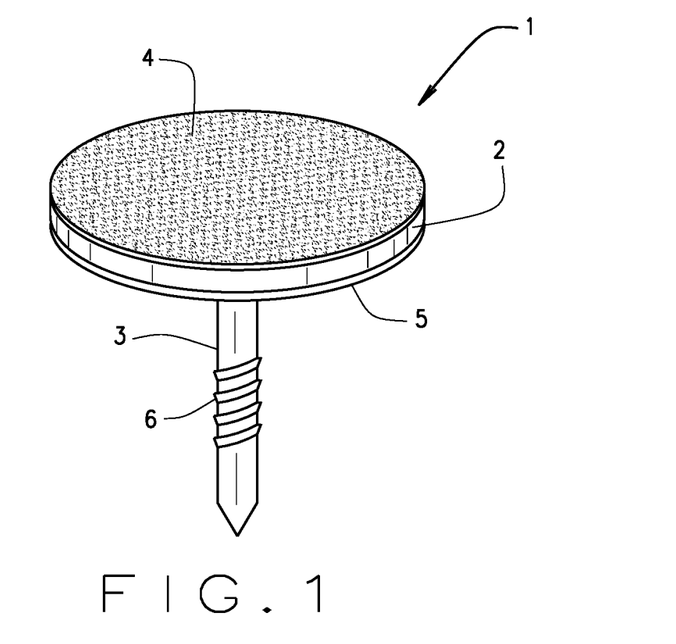
FIG. 1 is a perspective view of one embodiment of a nail/disk structure for eliminating exposed nail heads constructed in accordance with the teachings of the present invention.
Figure 2:
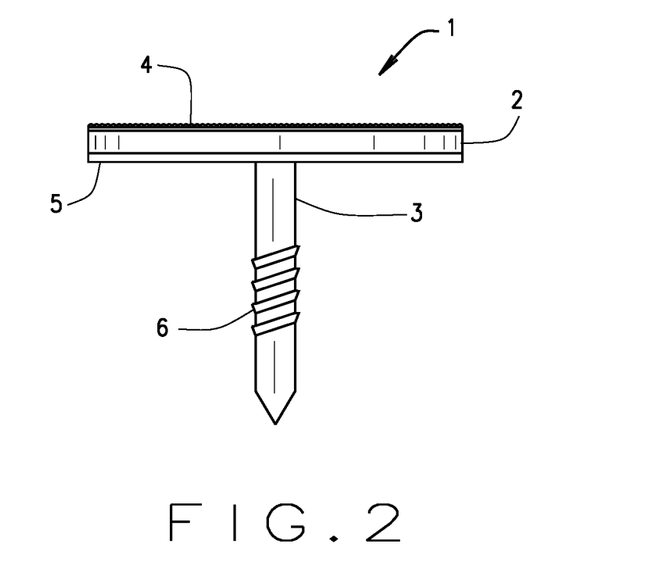
FIG. 2 is a side elevational view of the nail/disk structure illustrated in FIG. 1.

Referring to the drawings more particularly by reference numbers wherein like members refer to like parts, FIG. 1 illustrates a nail/disk structure 1 for eliminating exposed nail heads associated with a typical asphalt shingled roof. FIG. 2 illustrates a side elevational view of the nail/disk structure 1 of FIG. 1 and includes a color matching disk or body member 2 which is integrally formed with a roofing nail 3 such that both the disk 2 and the nail 3 are manufactured together. The body of the disk 2 can be made from an asphalt shingle and it can take on any shape including, but not limited to, a round shape, a rectangular shape, or a square shape. The disk 2 can also be made of a hail impact resistant shingle type material which can include a reinforcing layer (not shown), or any other suitable material. The top portion 4 of disk 2 includes colored granules embedded into its top surface so as to match the color scheme of the particular asphalt shingles being used for a particular application. In this regard, the disk 2 can be made from a different material other than asphalt and the color granules 4 can be applied and attached thereto in any conventional manner. In another embodiment, disk 2 and color granules 4 can be one unitary structure formed from a color matching asphalt shingle itself. Either way, the disk portion 2 is color coordinated to the asphalt shingles to which it will be applied.

A sealant 5 can optionally cover the underside portion of disk 2 as best illustrated in FIG. 2 thereby allowing the disk to permanently seal to the existing shingle when the present nail/disk structure 1 is nailed into an existing shingle. The sealant can be a heat activated sealant which is preferably activated by the sun although other heat sources can be used to bond the disk 2 to an existing shingle. Other adhesives can likewise be used in place of sealant 5. Regardless, the sealant 5 or other adhesive helps to prevent water from entering under the disk surface. The nail structure 3 may include a barbed structure 6 to further improve attachment to the existing shingle.

The present nail/disk structure 1 can be used in all places where an exposed nail head would typically exist on a shingle roof. This could include use as the last course of nails on a typical shingled roof at the apex of the roof, at edges abutting dormers and chimneys, and at other places where an exposed nail head would occur. The present nail/disk structure 1 eliminates the need for caulking or using other sealants to cover exposed nail heads as previously explained and its use saves time, money and improves the sealing capacity associated with exposed nails in a typical shingled roof. A roofing technician would carry a plurality of the nail/disk structures 1 along with typical roofing nails and would use the present structure 1 at all locations where the roofing nail will not be covered by another shingle. The present system and structure would be compatible with the life of new roof shingles; it will match the colors associated with a particular roof and it eliminates exposed nail heads.

A cellophane tape or other release tape (not shown) can be placed over the sealant 5 so as to prevent the sealant from binding to any other material during shipment and storage. The roof technician would have to remove the release tape prior to nailing the present structure 1 into an asphalt shingle. The present structure 1 provides a water-proof roofing nail seal combination that prevents corrosion of nail heads due to exposure to the elements and also provides leak protection since the disk 2 substantially overlays the hole formed in the existing shingle through which the nail 3 is hammered. In addition, the sealant 5 likewise provides additional leak protection if used. If a sealant is used, the sealant causes the disk 2 to permanently seal to the existing shingle and further prevents water from entering under the disk 2. Other advantages and features of the present nail/disk structure 1 will be apparent to those skilled in the art.

Figure 3:
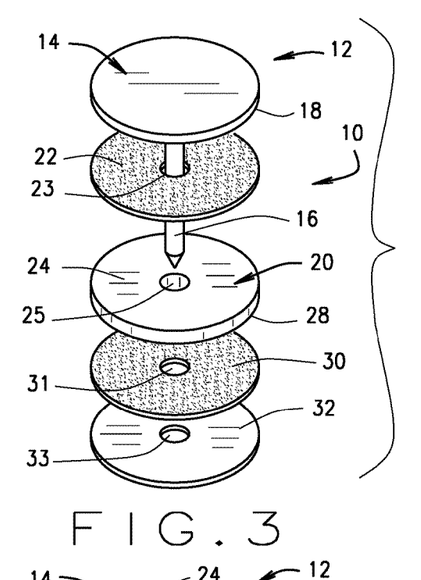
FIG. 3 is an exploded perspective view of a nail and gasket system constructed in accordance with the teachings of the present invention.
Figure 4:
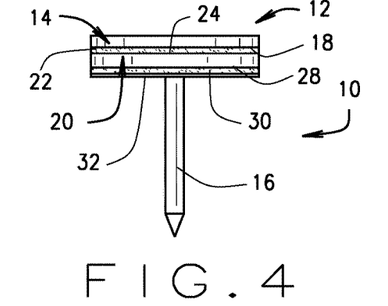
FIG. 4 is a side elevational view of the nail and gasket structure of FIG. 3.

A separate embodiment of a fastener and gasket structure or system 10 is provided in FIGS. 3 and 4 for fastening sheet metal to an existing roof structure. A fastener 12 of FIGS. 3 and 4 is embodied as a nail 12 as commonly known and often used in the roofing and other industries. The nail 12 includes each of an enlarged fastener or nail head 14 and a body member or shank portion 16 that extends downwardly therefrom. It is preferable that the nail head 14 and body portion 16 are manufactured as integrally formed with one another. The nail head 14 is preferably enlarged in relation to a standard-sized roofing nail head. As such, its diameter may range from 2 to 3 times larger than the diameter of a standard or conventional-sized roofing nail head. Typically, a standard-sized roofing nail head will have a diameter of about ⅝ of an inch. The present nail head 14 will have a diameter of anywhere from about 1⅙ of an inch to about 1⅞ of an inch or larger. The gasket member 20 will be of comparable size. The nail head 14 may take on a number of different shapes including oval or square shapes. The body member 16 of the nail 12 may be of a variety of shank styles as commonly known and used in the art. For example, the body member 16 may be a ring shank, barbed shank, or smooth style shank. The body member 16 may also take on a variety of lengths, gauges, or styles such as, but not limited to, self-tapping, sheet metal or wood styles of threads, shanks and/or tips. The nail 12 may be made of a variety of materials including steel, copper, or aluminum, and may be produced with a mill or a painted surface.

A bottom surface 18 of the fastener head 14 is preferably attached to a gasket member 20 by a sealant or adhesive 22. The sealant 22 preferably attaches a top surface 24 of the gasket 20 to the bottom surface 18 of the fastener head 14. The top surface 24 of the gasket 20 and the bottom surface 18 of the fastener head 14 are preferably factory installed to one another. A bottom surface 28 of the gasket member 20 is also provided with a sealant or adhesive 30. A cellophane tape or other material 32 is placed over the underside of sealant 30 to prevent the sealant from binding to any other material or object during shipment and storage. The tape 32 is removed prior to using the fastener and gasket structure 10 to attach sheet metal to a roofing structure.

It is recognized that sealant 22, gasket member 20, sealant 30 and release tape 32 may each include throughholes 23, 25, 31 and 33 respectively to provide space for the nail body member or shank 16 to pass therethrough. In this regard, the holes 23 and 31 associated with the sealants 22 and 30 may be foil led by simply applying the sealant around the nail body member or shank 16.

To use the fastener and gasket structure 10, as set forth above, the tape 32 should first be removed to expose the sealant 30. Then, when the fastener 12 is lined up at a position where a technician desires to attach sheet metal to an existing structure, a hammer or other mallet-like device can be used to deliver a blow to the nail head 14. With that, the nail body member or shank portion 16 is driven downwardly through the sheet metal and into the roof structure below, which may be wood or another commonly used construction material. When the nail 12 is driven into the roof structure, the gasket member 20 is also preferably driven toward the sheet metal being attached to the roof structure. The sealant 30 contacts the sheet metal, and the aggressive sealing qualities of the sealant 30 causes the gasket member 20 to be strongly, if not permanently, bonded to the sheet metal. The sealant 30 can be a heat activated sealant which is preferably activated by the sun although other heat sources can be used to bond the gasket member 20 to sheet metal. Other adhesives can likewise be used in place of sealant 30. Regardless, the sealant 30 or other adhesive helps to prevent water from entering under the nail head 14 by providing a seal between the gasket 20 and the sheet metal. Moreover, because the nail 12 has an enlarged head 14, even if water were to breach the seal provided between the gasket 20 and the sheet metal, because the nail head 14 and gasket 20 are enlarged, water would have to travel under the nail head a greater radial distance to reach the fastener hole as compared to a conventionally-sized nail head. In alternative embodiments, the nail body 16 may also include a barbed structure to further improve attachment to the sheet metal.

It is important to recognize that the present fastener and gasket system or structure 10 will be bonded or glued to the sheet metal permanently as a result of the sheet metal coming into contact with the aggressive adhesive 30 associated with the bottom surface 28 of the gasket 20. Even when the present fastener system 10 is installed over an unavoidable void in the roof structure below, the present fastener system 10 will not back out or pop up because the gasket material is aggressively adhered to the sheet metal and will create a permanently waterproof bond/connection between the fastener 10 and the underlying sheet metal. The enlarged fastener head 14 as well as the enlarged gasket 20 likewise provide greater protection as compared to a conventionally-sized nail typically used in these types of situations.

Figure 5:
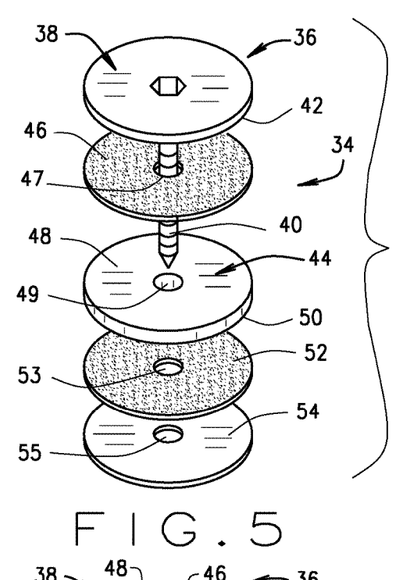
FIG. 5 is an exploded perspective view of a screw and gasket structure constructed in accordance with the teachings of the present invention.
Figure 6:
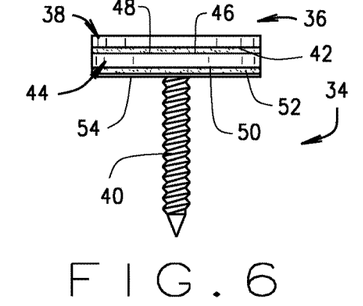
FIG. 6 is a side elevational view of the screw and gasket structure of FIG. 5.

FIGS. 5 and 6 illustrate a second embodiment of a fastener and gasket structure 34 for attaching sheet metal to a roofing structure. The fastener and gasket structure 34 is substantially similar to the fastener and gasket structure 10 except that a screw 36 is used instead of the nail 12 as the fastener. The screw 36 may be made of a variety of materials including steel, copper, or aluminum, and may be produced with a mill or a painted surface. Like the nail 12, the screw 36 includes each of an enlarged fastener or screw head 38 and a body member or shank 40 that extends downwardly therefrom. The screw head 38 and body or shank portion 40 are preferably manufactured so as to be integrally formed with one another, and the screw head 38 is also enlarged in relation to a standard-sized roofing screw head. Its diameter may also range from 2 to 3 times larger than the diameter of a standard-sized roofing screw head. Like the nail head 14, the screw head 38 may take on a number of different shapes including oval or square shapes. The body member 40 of the screw 36 may also take on a variety of shank styles as commonly known and used in the art such as a self-tapping, sheet metal, or wood style shank. The body member 40 may also be made in a variety of lengths and gauges.

A bottom surface 42 of the fastener head 38 is preferably attached to a gasket member 44 by sealant or adhesive 46. The sealant 46, like the sealant 22, preferably attaches a top surface 48 of the gasket 44 to the bottom surface 42 of the fastener head 38. The top surface 48 of the gasket 44 and the bottom surface 42 of the fastener head 38 are preferably factory installed. The gasket member 44 is also provided with a bottom surface 50 having an additional sealant or adhesive 52 associated therewith. As was the case for the fastener and gasket system 10, a cellophane tape or other material 54 is placed over the underside of sealant 52 to prevent the sealant from binding to any other material or object during shipment and storage. The tape 54 is likewise removed prior to using the fastener and gasket system 34 to attach sheet metal to a roofing structure.

Here again, it is recognized that sealant 46, gasket member 44, sealant 52 and release tape 54 may each include through holes 47, 49, 53 and 55 respectively to provide space for the screw body member 40 to pass therethrough In this regard, the holes 47 and 53 associated with the sealants 46 and 52 may again be formed by simply applying the sealant around the screw body member 40.

The fastener and gasket system 34 is also used to attach sheet metal to a roofing structure, and it does so using a method substantially similar to that used by the fastener and gasket system 10 described above. However, in the fastener and gasket system 34, because the fastener is a screw, the screw 36 is screwed into the sheet metal and roofing structure, rather than being driven into the same. The screw 36 may be screwed into the sheet metal and roofing structure using a drill or screw gun in a manner commonly used by those skilled in the art.

Figure 7:
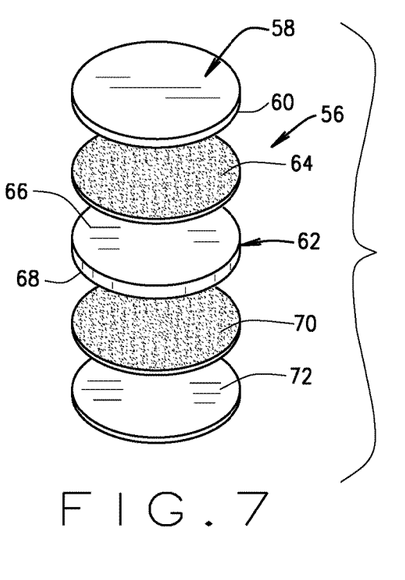
FIG. 7 is an exploded perspective view of a cap and gasket structure constructed in accordance with the teachings of the present invention.
Figure 8:
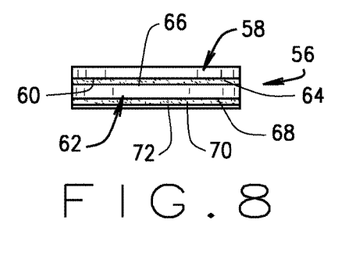
FIG. 8 is a side elevational view of the cap and gasket structure of FIG. 7.

In FIGS. 7 and 8, yet another alternative system is disclosed to cover up leaky sections of sheet metal located where sheet metal is attached to a roofing structure via a fastener. A cap and gasket system 56 is provided that can be used to cover fastener holes left in sheet metal when nails or screws are removed, or become faulty and leak. The cap and gasket system 56 may also be placed directly over nail or screw heads in the sheet metal instead of caulking those attachment points, as is often done currently. The cap and gasket system 56 includes an enlarged cap member 58 and a similarly shaped gasket member 62. The cap member 58 may likewise have a diameter that ranges from about 2 to 3 times larger than a standard sized roofing nail or screw head. In FIG. 7, the cap member 58 is shown as circular, but it may take on a wide variety of different shapes including oval or square shapes. The cap member 58 may be made of a variety of materials like fasteners 10 and 34 including steel, copper, or aluminum, and may be similarly produced with a mill or a painted surface. A bottom surface 60 of the cap member 58 is preferably attached to the enlarged gasket 62 by a sealant or adhesive 64. The sealant 64 preferably attaches the top surface 66 of the gasket member 62 to the bottom surface 60 of the cap member 58, the cap member 58 and the gasket member 62 being again both enlarged and preferably factory installed. The gasket member 62 is also provided with a bottom surface 68 having an additional sealant or adhesive 70 associated therewith. As was the case for the fastener and gasket systems 10 and 34, a cellophane tape or other material 72 is placed over the underside of sealant 70 to prevent the sealant from binding to any other material or object during shipment and storage. The tape 72 is likewise removed prior to using the cap and gasket system 56 to repair portions of the sheet metal that are leaking or are likely to leak.

The cap and gasket system 56 can be used to cover up nails or screws previously used to attach sheet metal to a roofing structure, or the holes left where nails or screws previously used to attach sheet metal to a roofing structure have been removed. In either case, the tape 72 should first be removed to expose the sealant 70. Then, when the cap and gasket system 56 is lined up at a position above a nail or screw, downward pressure can be applied to the system 56 so that the gasket member 62 is also pushed toward the sheet metal. The sealant 70 contacts the sheet metal, and the aggressive sealing qualities of the sealant 70 cause the gasket member 62 to be strongly, if not permanently, bonded to the sheet metal. Like the sealant 30, the sealant 70 can be a heat activated sealant which is preferably activated by the sun although other heat sources can be used to bond the gasket 62 to sheet metal. Other adhesives can likewise be used in place of sealant 70. Regardless, the sealant 70 or other adhesive helps to prevent water from entering under the cap member 58 by providing a seal between the gasket member 62 and the sheet metal. Moreover, because the cap 58 has an enlarged head, even if water were to breach the seal provided between the gasket member 62 and the sheet metal, it would still provide greater protection because the cap 58 and gasket 52 are enlarged as compared to a conventionally-sized nail or screw and water again would have to travel a greater distance to the fastener hole or leaking section as compared to conventionally-sized nails or screws.

With respect to the fastener/gasket system associated with fasteners 10 and 34 as well as with the cap/gasket system 56, it is recognized and anticipated that a factory or field applied adhesive used in each of the various fastener or cap systems can likewise be an adhesive or sealant that is aggressive enough to be applied at acceptable, ambient temperatures using only sufficient downward pressure through the appropriate attachment process as explained above for each respective fastener/gasket structure so as to laminate or attach both the bottom portion of each respective gasket 20, 50 or 62 to the sheet metal or other appropriate roof structure. Once each respective fastener or cap system is attached to the sheet metal, a small roller tool made from metal, rubber, wood or other suitable materials can likewise be used to apply a further concentrated pressure to the respective fastener/gasket or cap/gasket system to further assure adequate attachment to the sheet metal structure. Still other adhesives, sealants or other appropriate glues or epoxies can likewise be used where sealants are required in each of their respective fastener or cap systems.

Understanding the scope of the present invention, the term "comprising" and its derivatives, as used herein, are intended to be open-ended terms that specify the presence of the stated features, elements, components and/or groups, but do not exclude the presence of other unstated features, elements, components and/or groups. The foregoing also applies to words having similar meanings such as the terms "including", "having" and their derivatives. The terms of degree such as "substantially", "about" and "approximate" as used herein mean a reasonable amount of deviation of the modified term such that the end result is not significantly changed.

Only selected embodiments have been chosen to illustrate the present inventions. The various constructions described above and illustrated in the drawings are presented by way of example only and are not intended to limit the concepts and principals of the present inventions. It is also recognized and anticipated that the size, shape, location and other orientation of the various components and/or elements associated with the present inventions can be changed as needed and/or as desired depending upon a particular application. Components that are shown directly connected or contacting each other can have intermediate structures disposed between them. In addition, the functions of one element can be performed by two elements, and vice versa. The structures and functions of one embodiment can also be adopted in another embodiment. It is not necessary for all advantages to be present in a particular embodiment at the same time. Thus, the foregoing descriptions of the embodiments according to the present inventions are provided for illustration only, and not for the purpose of limiting the inventions as defined by the appended claims and their equivalents.

Thus, there has been shown and described an integral nail/disk structure for eliminating exposed roofing nails and a novel nail or screw gasket system for affixing sheet metal to a roofing structure or covering up nails or screws in sheet metal attached to a roofing structure. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

The invention claimed is:

1. A fastener system for attaching sheet metal to a roofing structure, the fastener system comprising:
   a fastener including a head portion having a top surface, a bottom surface and a body portion extending downwardly from the bottom surface of said head portion, the head portion being at least 2 to 3 times larger than the head portion of a standard sized roofing nail;
   a gasket member surrounding the body portion and engaged with the bottom surface of the head portion, the gasket member being the same size as the bottom surface of the head portion and having a top and a bottom surface; and
   a sealant covering at least a portion of the bottom surface of the gasket member.

2. The fastener system defined in claim 1 including release tape overlaying the sealant covering at least a portion of the bottom surface of the gasket member.

3. The fastener system defined in claim 1 wherein the sealant is a heat activated sealant.

4. The fastener system defined in claim 1 wherein the head portion and the body portion of the fastener are integrally formed.

5. The fastener system defined in claim 1 wherein the fastener is a nail.

6. The fastener system defined in claim 5 wherein the body portion is one of a ring shank, a barbed shank, or a smooth style shank.

7. The fastener system defined in claim 1 wherein the fastener is a screw.

8. The fastener system defined in claim 7 wherein the body portion is one of a self-tapping, a sheet metal, or a wood style shank.

9. The fastener system defined in claim 1 wherein said gasket member is engaged with the bottom surface of said head portion through the use of a sealant.

\* \* \* \* \*

UNITED STATES PATENT AND TRADEMARK OFFICE
CERTIFICATE OF CORRECTION

PATENT NO. : 10,138,919 B2
APPLICATION NO. : 15/486743
DATED : November 27, 2018
INVENTOR(S) : Thomas R. Mathieson It is certified that error appears in the above-identified patent and that said Letters Patent is hereby corrected as shown below:

In the Specification

In Column 7, Line 2, delete "foil led" and replace with -- formed --

Signed and Sealed this
Third Day of September, 2019

Andrei Iancu
*Director of the United States Patent and Trademark Office*